United States Patent
Nirell et al.

(10) Patent No.: US 9,110,688 B2
(45) Date of Patent: *Aug. 18, 2015

(54) SYSTEM AND METHOD FOR REPRESENTATION OF OBJECT ANIMATION WITHIN PRESENTATIONS OF SOFTWARE APPLICATION PROGRAMS

(75) Inventors: Magnus Nirell, Solana Beach, CA (US); Cecil Kift, San Diego, CA (US); Nathan Rich, San Diego, CA (US); Jorgen S. Lien, La Jolla, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2874 days.

This patent is subject to a terminal disclaimer.

(21) Appl. No.: 11/496,703

(22) Filed: Jul. 31, 2006

(65) Prior Publication Data
US 2007/0033574 A1 Feb. 8, 2007

Related U.S. Application Data

(63) Continuation of application No. 10/370,271, filed on Feb. 20, 2003, now Pat. No. 7,086,032.

(51) Int. Cl.
*G06F 9/44* (2006.01)
*G06F 3/0481* (2013.01)
(52) U.S. Cl.
CPC .......... *G06F 9/4446* (2013.01); *G06F 3/04812* (2013.01)
(58) Field of Classification Search
CPC .................. G06F 3/04812; G06F 9/4446
USPC .................... 717/106–113, 125–128
See application file for complete search history.

(56) References Cited

U.S. PATENT DOCUMENTS

| 5,374,942 | A | * | 12/1994 | Gilligan et al. ............... 345/157 |
| 5,745,738 | A |   | 4/1998  | Ricard |
| 5,826,102 | A |   | 10/1998 | Escobar et al. |
| 5,850,548 | A |   | 12/1998 | Williams |

(Continued)

OTHER PUBLICATIONS

Vikki Olds, "Techsmith's Camtasia, SnagIt and DubIt", 2002, DT Designer Today, 10 pages.*

(Continued)

*Primary Examiner* — Ted T Vo
(74) *Attorney, Agent, or Firm* — Kilpatrick Townsend & Stockton LLP

(57) ABSTRACT

A system and method for representing object animation, such as the movement of mouse pointers, within presentations based on software application programs or other information displayed by a computer system is disclosed herein. In one aspect the method is directed to representing animation of a mouse pointer object during creation of a presentation based on such displayed information. The method includes storing a first mouse pointer position relative to a first screen shot derived from the displayed information. In addition, a second mouse pointer position is also stored relative to a second screen shot derived from the displayed information. The method farther includes displaying, with respect to the first screen shot, a previous path portion to a displayed mouse pointer position and a next path portion from the displayed mouse pointer position. The previous path portion and the next path portion are representative of a mouse pointer path traversed during playback of the presentation. In a particular implementation the first and/or second mouse pointer positions may be modified during operation in an edit mode.

13 Claims, 14 Drawing Sheets

(56) References Cited

U.S. PATENT DOCUMENTS

| | | | |
|---|---|---|---|
| 6,020,886 A | 2/2000 | Jacober et al. | |
| 6,167,562 A | 12/2000 | Kaneko et al. | |
| 6,392,675 B1 * | 5/2002 | Becker et al. | 715/858 |
| 6,404,441 B1 * | 6/2002 | Chailleux | 715/704 |
| 6,467,080 B1 | 10/2002 | Devine et al. | |
| 7,086,032 B2 * | 8/2006 | Nirell et al. | 717/113 |
| 2006/0203006 A1 * | 9/2006 | Georgeson | 345/619 |

OTHER PUBLICATIONS

Shannon, "RoboDemo 3.0—eHelp," New Jersey PC User Group, pp. 1-6, and 68 pages of Demo, Apr. 2002.

* cited by examiner

| Translation Process | Run-time Display |
|---|---|
| Load Alpha Frame | Copy of background of Frame 1 appears |
| Load Objects (Alpha Frame) | null |
| Display Caption (1) | "Click on 2" appears. |
| Mouse Movement (1) | In this example, no movement since Mouse is already at the number 2. |
| Mouse Click (1) | Mouse clicks the number 2. |

| Translation Process | Run-time Display |
|---|---|
| Load Frame (1) | Frame (1) displays. |
| Objects Frame (1) | "Look at the Result" appears. |
| Caption (2) | "Click on +" appears. |
| Mouse Movement (2) | Mouse moves towards the + |
| Mouse Click (2) | Mouse clicks the + |

Edit Mode Frame 2

| Translation Process | Run-time Display |
|---|---|
| Load Frame (2) | Frame 2 displays. |
| Objects Frame (2) | Null |
| Caption (3) | "Click on 9" displays |
| Mouse Movement (3) | Move the mouse towards the 9 |
| Mouse Click (3) | Click the 9 |

| Translation Process | Run-time Display |
|---|---|
| Load Frame (4) | The number 11 displays in the calculator display area. |
| Objects Frame (4) | Display "Look at the Result" |

SYSTEM AND METHOD FOR REPRESENTATION OF OBJECT ANIMATION WITHIN PRESENTATIONS OF SOFTWARE APPLICATION PROGRAMS

This is a continuation of U.S. application Ser. No. 10/370,271, filed Feb. 20, 2003, entitled "SYSTEM AND METHOD FOR REPRESENTATION OF OBJECT ANIMATION WITHIN PRESENTATIONS OF SOFTWARE APPLICATION PROGRAMS", now issued as U.S. Pat. No. 7,086,032, the disclosure of which is hereby incorporated herein by reference.

FIELD OF THE INVENTION

The present invention relates generally to computer software and, more particularly, to an improved method and system for representing object animation within demonstrations and presentations based on displayed information such as that generated by software application programs.

BACKGROUND OF THE INVENTION

Over the past several decades, computer-related hardware and software technologies have experienced abundant growth. As is known, both hardware and software technologies have become increasingly powerful and sophisticated, which has enabled projects to be completed significantly more quickly than ever before. However, the increasing complexity of such technologies, particularly software, has required extensive investments in connection with the installation, training and maintenance of such programs.

User training has emerged as a particularly significant expense in connection with deployment of software application programs. For example, many application programs now contain numerous complicated features, each of which is effected using a different sequence of steps. As a consequence, users may experience difficulty in recalling the sequence of steps necessary to cause a desired operation to be performed. Accordingly, it has been common to incorporate various "help" systems within such programs. Many such systems initially comprised textual descriptions of the steps related to a given operation, which were presented upon the request of the user.

Although text-based help systems may offer acceptable performance in character-based environments, such systems have proven less effective in contexts in which graphics may be employed. For example, it is often impractical to employ text based help systems to identify areas of the user's screen or specific graphic images requiring manipulation in order to complete a particular function. Accordingly, many help systems now rely upon text as well as graphic images of particular icons and buttons in explaining various program operations. For example, the RoboHelp™ product available from the assignee of the present invention enables quick and easy creation of professional text and graphic-based help systems for Windows-based and Web-based applications.

However, in certain cases it may be difficult to convey to end-users how certain software program features are accessed and used with static text/graphic-based help systems. As a result, demonstration systems have been developed in which an animated display of the performance of a set of procedural steps is generated for viewing by the applicable user. These animated demonstrations have often been produced by creating a sequence of bitmap images of the display screen (i.e., "screen shots"), with one or more screen shots being used to illustratively represent a single operational step. In certain approaches the author of the demonstration uses a screen capture program to record the physical actions of an expert user while stepping through a software procedure. These actions may include, for example, moving a mouse cursor to a specific screen area, selecting from among available options via dialog boxes and menus, and entering text through a keyboard. Upon recording of the procedure, the demonstration may be edited to add captions and sound. Unfortunately, editing of the resultant demonstration file tends to be tedious and time-consuming, and it may be necessary to record the procedure again in order to correct an error or modify the demonstration as a result of a corresponding change in functionality of the application program.

Related products facilitating creation of demonstrations of software application programs ("demos") and tutorials have also been developed. For example, the RoboDemo™ product, which is commercially available from the assignee of the present invention, comprises a tool for creating animated, interactive demonstrations of software and related tutorials. The RoboDemo™ product is configured to enable creation of Flash® movies based on any application in use, or any onscreen activity, which may then be played back as a demo or tutorial. Authors may also easily enhance recorded movies with captions, images, click boxes, scoring, text boxes, audio, and special effects. In this way the RoboDemo™ product may be utilized to create training tutorials, marketing demonstrations, and other presentations relating to the applicable software application program.

However, in certain commercially available products enabling automated development of demonstrations, tutorials and the like, the authoring process is complicated by the difficulty of appropriately placing annotation and caption objects upon the constituent screen shots during the "edit" mode of operation. That is, it has proven somewhat difficult to accurately specify the location of such objects upon individual screen shots while in edit mode in such a way that a desired position of such objects is achieved during the subsequent playback of the resultant presentation file.

SUMMARY OF THE INVENTION

The present invention provides a system and method for representing object animation, such as the movement of mouse pointers, within presentations based on software application programs or other information displayed by a computer system.

In one aspect the invention provides a method for representing animation of a mouse pointer object during the creation of a presentation based on information displayed by a computer system. This method includes storing a first mouse pointer position relative to a first screen shot derived from the displayed information. In addition, a second mouse pointer position is stored relative to a second screen shot derived from the information. The method further includes displaying, with respect to the first screen shot, a previous path portion and a next path portion near a displayed mouse pointer position. The previous path portion and the next path portion are representative of a mouse pointer path traversed during playback of the presentation. In a particular implementation the first and/or second mouse pointer positions may be modified during operation in an edit mode.

In another aspect, the invention relates to a computerized method for creating a presentation based on displayed information. The method involves automatically translating certain object information between frames when transitioning from an edit mode to a run-time mode in order to facilitate the positioning of such information during the editing process.

The method includes capturing a first screen shot containing a first portion of the displayed information, and capturing a second screen shot containing a second portion of the displayed information. During operation in the edit mode, the method involves specifying the position of a first caption object relative to a particular screen shot. A desired sequence of display of the first caption object relative to the mouse pointer animation occurring during playback of the presentation may also be specified. The first caption object is then displayed with reference to a different screen shot in the desired sequence during the playback of the presentation.

In a further aspect, the present invention pertains to a computerized method for creating a presentation based on displayed information. The method comprises capturing a first screen shot containing a first portion of the displayed information and a second screen shot containing a second portion of the displayed information. The method also involves storing a first mouse pointer position relative to the first screen shot and a second mouse pointer position relative to the second screen shot. A previous path portion and a next path portion are then displayed near a displayed mouse pointer position. The previous path portion and the next path portion are representative of a mouse pointer path traversed during playback of the presentation. In a particular implementation the first and/or second mouse pointer positions may be modified during operation in an edit mode.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Introductory Overview

The present invention relates to various improvements to authoring programs of the type generally used to create a presentation based on an application program. In particular, the invention provides an improved technique of introducing annotation, mouse pointer movement and animation information to a sequence of screen shots captured from the underlying application program. As is described hereinafter, the inventive authoring technique advantageously permits accurate addition of such information to the underlying sequence of screen shots during program operation in an edit mode. The inventive technique also provides, during edit mode operation, a unique and improved representation of the mouse pointer animation occurring during subsequent playback of the applicable presentation in a run-time mode.

Figure 1:
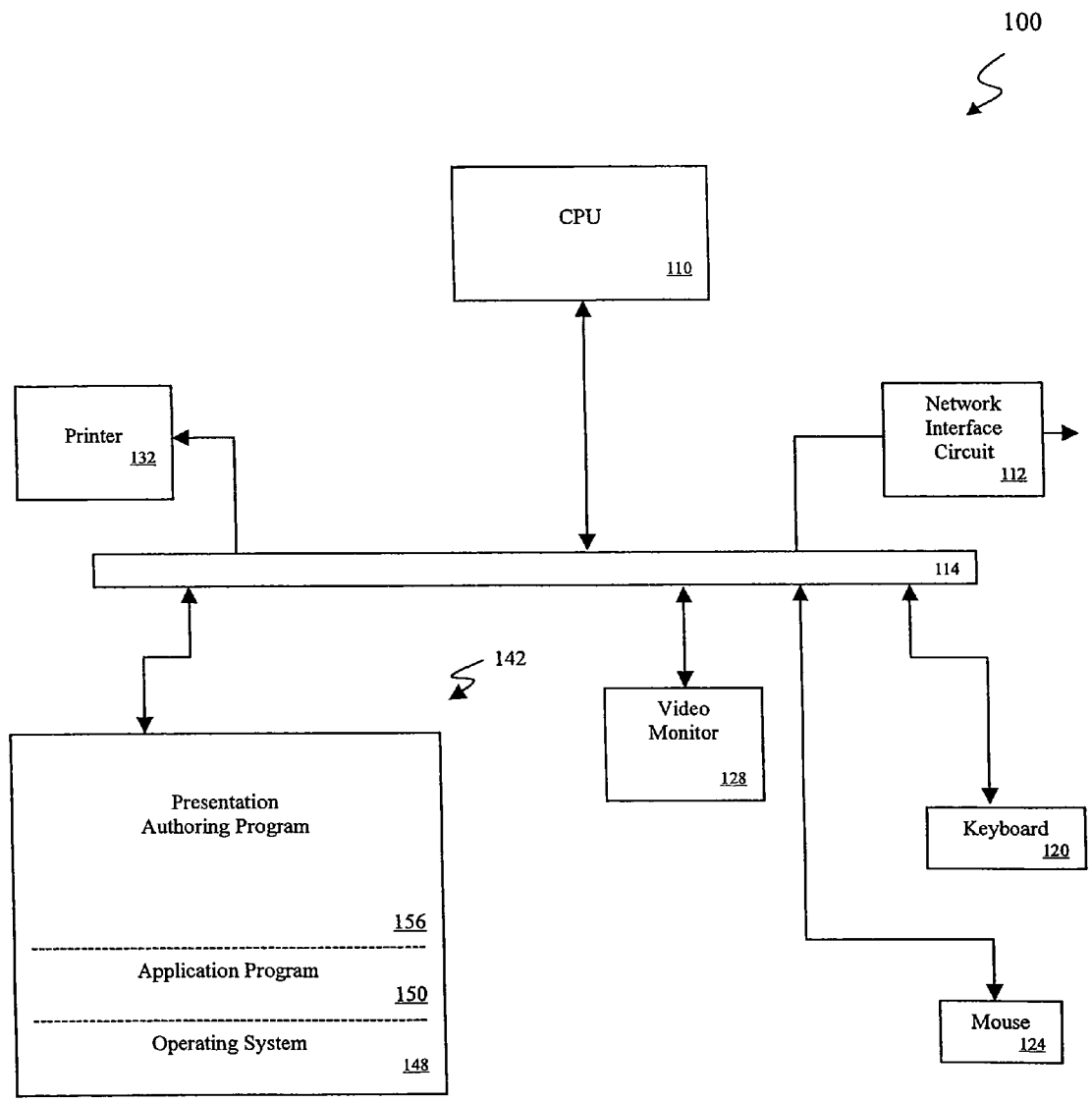
FIG. 1 is a block diagram of a user computer capable of executing a presentation authoring program incorporating the unique approaches to editing and animation representation contemplated by the present invention.

Turning now to FIG. 1, a block diagram is provided of a user computer 100 capable of executing a presentation authoring program incorporating the unique approaches to editing and animation representation contemplated by the present invention. As shown, the user computer 100 includes a CPU 110 and network interface circuit 112, which communicate over a system bus 114. The network interface circuit 112 enables communication between the user computer and an external network (not shown). The CPU 110 also communicates with a set of input/output devices over the system bus 114. Such input/output devices may include, for example, a keyboard 120, mouse 124, video monitor 128, printer 132, and other conventional devices. The CPU 110 is also connected to memory 142 (primary and/or secondary) via the system bus 114. The mode of interaction between the CPU 110, input/output devices, system buses 114, and memory 142 is known in the art. The memory 142 stores a number of software programs and routines executed by the CPU 100. In particular, the memory includes the operating system 148 for the computer 100, one or more application programs 150, and an authoring program 156 of the present invention. The computer 100 need not necessarily have this configuration, and this configuration is intended to be merely illustrative.

In the exemplary embodiment the inventive presentation authoring program 156 comprises the above-referenced RoboDemo™ product as enhanced to provide the functionality described below. However, it should be understood that the teachings of the invention are not limited to this exemplary embodiment, and may be applied to, for example, augment and improve the functionality of other commercially available authoring programs.

Within the system of FIG. 1, the presentation authoring program 156 operates to capture screen shots from the application program 150 and transform them into "movies"; that is, into a presentation based on a sequence of such screen shots optionally including an animated mouse pointer and interactive elements. These screen shots are each displayed for a specified interval during playback of the applicable movie or other presentation. Advantageously, these movies are of small file size and may be output to the Flash® file format (.SWF file). This enables playback of the movies at a later time using any standard Web browser, and obviates the need for downloading of specialized players or plug-ins. Each movie generated by the presentation authoring program 156 may also be output to the user as an executable (.EXE) or Microsoft® Word file (.DOC).

In addition to merely capturing screen shots from the application program 150, during edit-mode operation the presentation authoring program 156 enables a user to add captions, callouts, click boxes, images, and audio (.WAV and .MP3 files) to the movie. Textual description in the form of captions and other objects may be added as desired In addition, the authoring program also permits the control of any mouse pointer movement which may occur during run-time mode (i.e., during playback of the file containing the movie or presentation). In this way it is possible to easily create, for example, full-featured product demonstrations, tutorials, and e-learning modules. In the exemplary embodiment various sequence controls (e.g., fast forward, play, stop) are made available for manipulation by the user during playback of the movie. The authoring program 156 will generally be configured to provide the opportunity for editing and arranging the frames comprising a given movie or presentation. These editing capabilities will generally enable, for example, the definition of characteristics such as mouse pointer shape, movement speed, and position.

Although in the exemplary embodiment the present invention is described with reference to screen shots of the type which may be created by a given application program, the teachings of the present invention may be equally applied to other varieties of "screen shots". These may be derived from, for example, an imported movie (e.g., an AVI file), an imported or inserted image, a blank frame, a colored frame, imported presentations of various formats (e.g., Power-Point® presentations), and other files containing graphics information.

Operation of Presentation Authoring Program

An initial step in using the presentation authoring program 156 to create a slide presentation or movie is to capture a sequence of screen shots generated by an application program or otherwise displayed by the computer 100. In the exemplary embodiment such screen shots are obtained using a desired combination of one or more capture modes depending upon the type of presentation it is desired to create. For example, in a Program capture mode a presentation may be created based on screen shots obtained from any application program 150 being executed by the CPU 110. In a Custom capture mode, the user of the computer is provided with the opportunity to specify the size and position of a capture window displayed by the presentation authoring program 156 upon a screen of the video monitor 128. In a Full Screen capture mode, all of the information within the "desktop" displayed by the monitor 128 is captured. Finally, in a Pocket PC capture mode, screens are captured in a resolution suitable for playback on a "Pocket PC" or similar handheld device.

The presentation authoring program 156 may be commanded to capture screen shots or to permit a user to capture screen shots manually. In a default mode of the exemplary embodiment, screen shots are manually captured by the user of the computer 100. In this mode, a selectable button (e.g., the Print Screen button) on keyboard 120 is depressed each time it is desired to capture what is currently being displayed upon the screen of the video monitor 128. Desired changes may then be made to the screen via the keyboard 120 and/or mouse 124 (e.g., moving a mouse pointer position, "pressing" an icon, or selecting a drop-down menu). Once such changes have been made, Print Screen is again depressed in order to capture the next screen shot. Alternatively, in the automatic capture mode the current screen (or specified portion thereof) displayed by video monitor 128 is captured each time a user changes the focus of an active application program 156 or otherwise presses a key of the keyboard 120. As is described below, once the above process of recording a sequence of screen shots has been completed, editing operations such as the insertion of audio or captions and the selection of display options may be performed.

Figure 2:
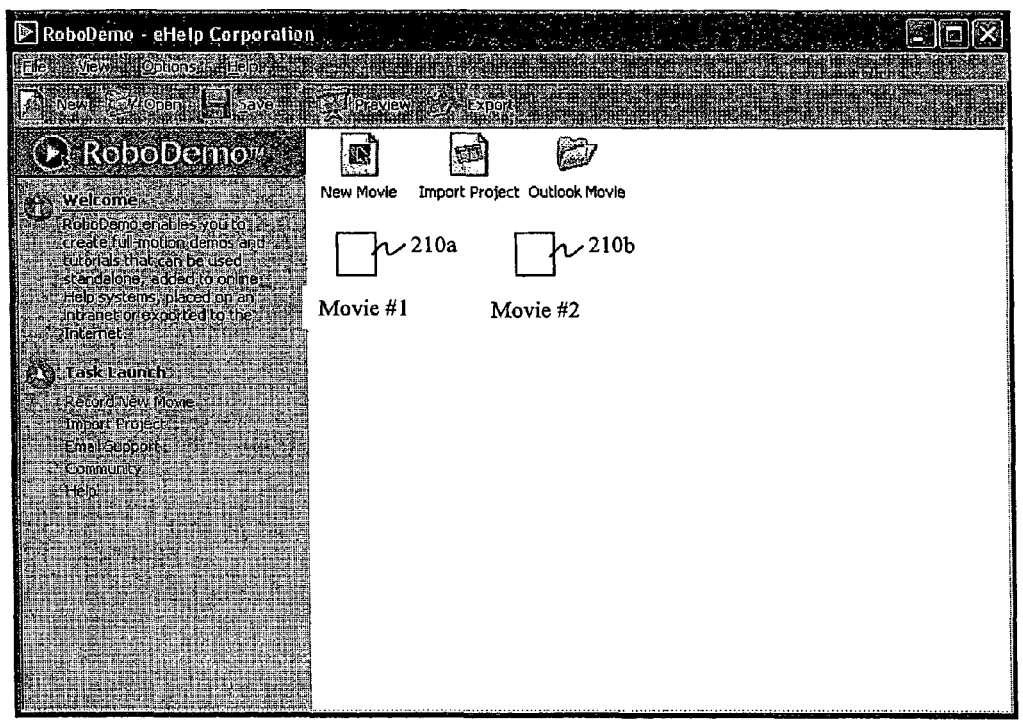
FIG. 2 is a screen display of a Projects View rendered upon opening of the inventive presentation authoring program.

Referring now to FIG. 2, a screen display of a Projects View 204 rendered upon opening of the presentation authoring program 156 is illustrated. As shown, the Projects View 204 includes icons 210 representative of movies or other presentations previously created using the program 156.

Figure 3:
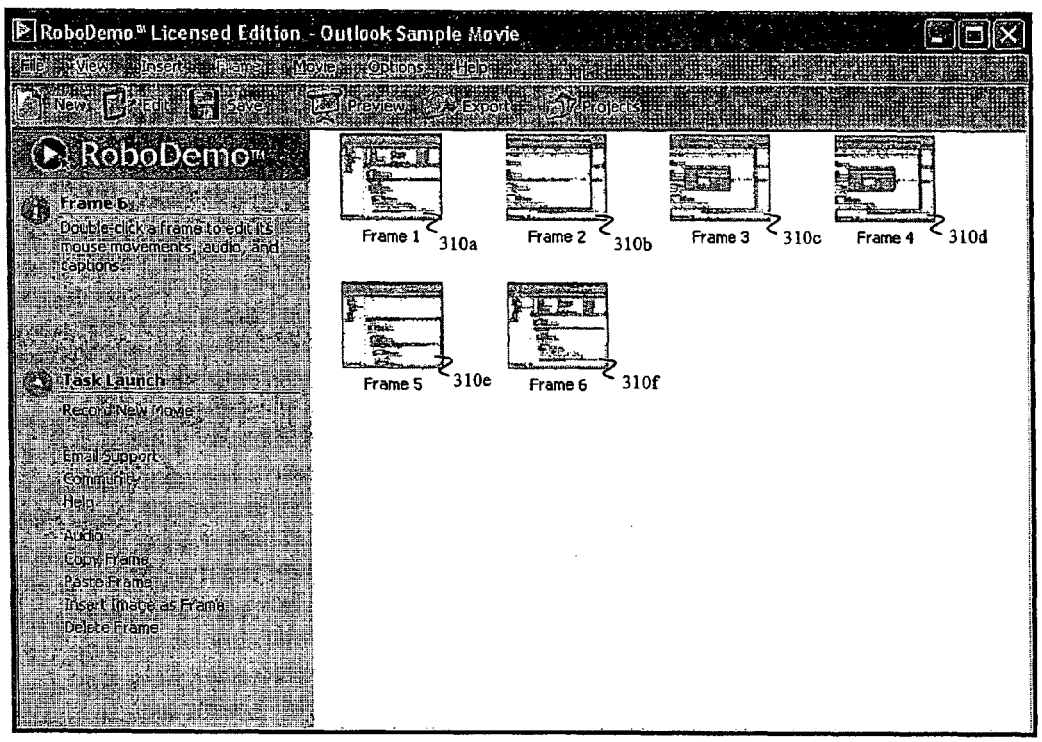
FIG. 3 illustratively represents a screen display of an exemplary Frame List View.

FIG. 3 illustratively represents an exemplary Frame List View 304 screen display. The Frame List View 304 appears upon monitor 128 when the user selects (i.e., "double-clicks" upon) an icon 210 within the Projects View 204 corresponding to a particular movie. Upon such selection the movie opens and small graphical representations 310 of the frames comprising the selected movie are displayed. The Frame List View 304 provides a convenient mechanism for simultaneously viewing all of the frames of a given movie, which facilitates appreciation of the "flow" of the movie. In general, frames may be copied, duplicated or rearranged within the Frame List View 304.

Figure 4:
FIG. 4 illustratively represents a screen display of an exemplary Frame Edit View.
Figure 4:
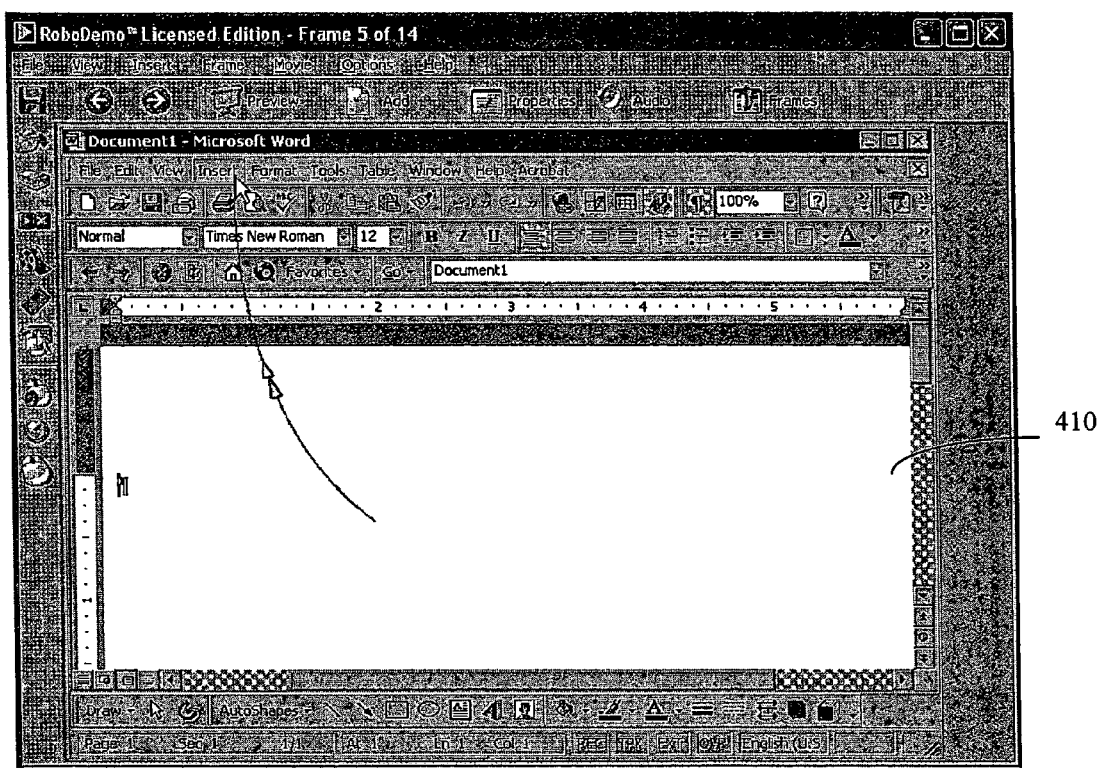

FIG. 4 illustratively represents an exemplary Frame Edit View 404 screen display. The Frame Edit View 404 of FIG. 4 is displayed by the monitor 128 upon selection of (i.e., double-clicking upon) a particular graphical representation 310 within the Frame List View 304. While in the Frame Edit View 404, a user may edit or otherwise change the displayed frame 410 by, for example, altering the mouse movement occurring during movie playback, changing the appearance of the mouse pointer, adding captions, adding highlight boxes, and specifying various playback parameters.

In the exemplary embodiment the authoring program 156 is also configured to create a preliminary demonstration or "preview" of the movie or presentation being created. As the movie plays the user may start, stop, pause, and advance the current frame or return to the previous frame. While the movie is previewing, the user may click a displayed "Edit" button in order to enter the Frame Edit View with respect to the current frame.

Mouse Pointer Animation

Figure 5:
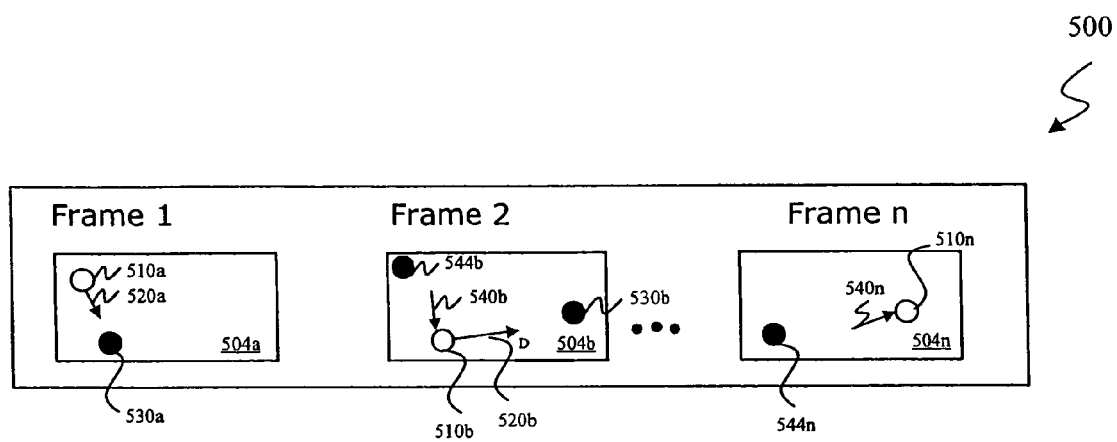
FIG. 5 depicts a sequence of simplified frames illustrating an improved method of capturing, editing and representing mouse pointer animation in accordance with the invention.

FIG. 5 depicts a sequence 500 of simplified frames illustrating an improved method of capturing, editing and representing mouse pointer animation in accordance with the invention. The improved method, which in the exemplary embodiment is practiced within the context of the Frame Edit View, advantageously only requires depiction of a single mouse pointer representation within each frame. This differs from existing approaches, in which both "starting" and "ending" cursor positions are generally depicted within each frame. It is anticipated that the method of the invention will lead to greater clarity of presentation and reduce user confusion with regard to the actual positioning and movement of mouse pointers occurring during playback mode.

Referring now to FIG. 5, each frame 504 is derived from a screen shot captured in the manner described above. Within each frame 504, a mouse pointer 510 (open circle) is displayed via video monitor 128 to a user of computer 100 during operation in Frame Edit View. In the initial frame 504a, the mouse pointer 510a is positioned at the position from which it will initially move within the frame 504a during subsequent playback of the movie containing the frames 504. Specifically, during such playback the mouse pointer 510a will move generally in the direction represented by next path portion arrow 520a until it reaches actual ending position 530a (not displayed to user during Frame Edit View). As shown, in the second frame 504b the mouse pointer 510b is positioned at or near the actual ending position 530a within the first frame 504a. More generally, in all frames $504_i$ except the first frame 504a and last frame 504n, the mouse pointer $510_i$ is positioned within a given frame $504_i$ at or near the actual ending position $530_{i-1}$ within the preceding frame $504_{i-1}$. During subsequent playback of a given frame $504_i$, the mouse pointer $510_i$ moves from the actual starting position $544_i$ to the actual ending position $530_i$ generally along the path defined by the applicable previous path portion arrow $540_i$ and next path portion arrow $520_i$. Although in the example of FIG. 5 a mouse pointer appears in each of several successive frames, the present invention may also be applicable to frame sequences in which the mouse pointer appears only intermittently and not within consecutive frames. Within Frame Edit View, a user may modify the current mouse pointer position by clicking and dragging to a desired location within the frame 504.

As mentioned above, each frame 504 is derived from a screen shot which had been previously captured and stored. As the editing of each frame 504 is completed, the relevant data pertaining to mouse pointer shape, position and movement within such frame 504 is separately stored. With respect to mouse pointer position, in the exemplary embodiment only the location of the "active" pixel or "hotspot" within the mouse pointer is stored following "clicking" of the mouse pointer by the user via mouse 124. That is, the two-dimensional parameters of the mouse pointer will generally not be stored, only the single (x,y) grid location of the active pixel.

Referring again to frame 504b, a previous path portion arrow 540b generally indicates the direction of the actual starting position 544b (not shown in Frame Edit View) from which the mouse pointer 510b moves during subsequent playback mode operation. Similarly, next path portion arrow 520b generally indicates the direction in which the mouse pointer 510b will be translated during playback mode until reaching actual ending position 530b. Within the last frame 504n, previous path portion arrow 540n generally indicates the direction of the actual starting position 544n (not shown in Frame Edit View) from which the mouse pointer 510n moves during subsequent movie playback. The mouse pointer 510n is positioned coincident with the actual ending position 530n (not shown) within frame 504n.

Although not indicated by FIG. 5, in practical implementations of the present invention the previous path portion arrow 540b and next path portion arrow 520b may be represented in different colors, animations, graphical symbols and the like in order to enhance clarity. In addition, the previous path portion arrow 540b and next path portion arrow 520b may each be of a length equivalent to a predefined percentage (e.g., 50%) of the distance between the actual ending position 530 and the actual starting position 544, as applicable.

Figure 6:
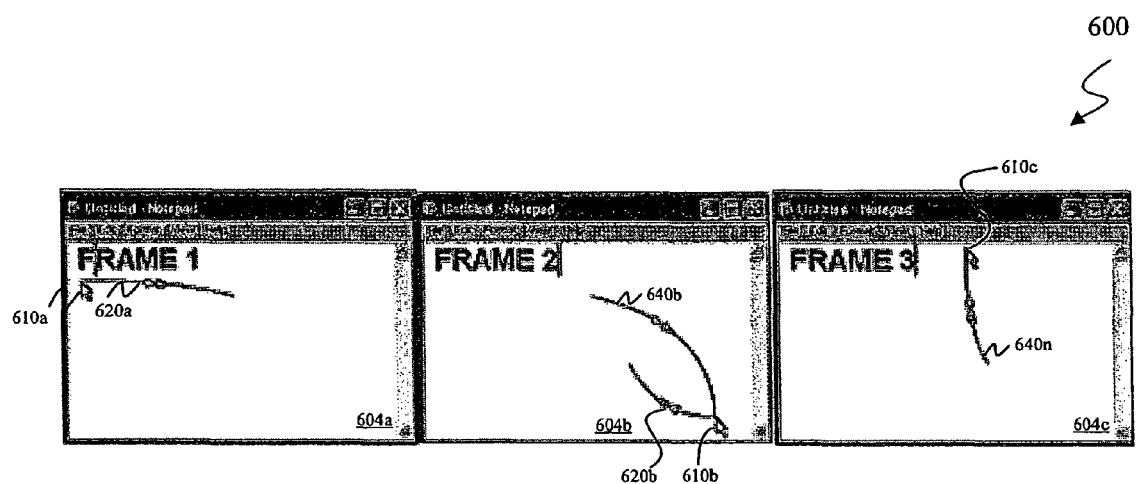
FIG. 6 depicts a sequence of frames illustrating the mouse pointer representation techniques of the invention in an implementation employing curved previous and next path portion arrows.

FIG. 6 depicts a sequence 600 of frames illustrating the mouse pointer representation techniques of the invention in an implementation employing curved previous/next path portion arrows. As shown, within each frame 604 a mouse pointer 610 is displayed via video monitor 128 during operation in Frame Edit View. In the initial frame 604a, the mouse pointer 610a is positioned at the position from which it will initially move within the frame 604a during subsequent playback of the movie containing the frames 604. Specifically, during such playback the mouse pointer 610a will move generally in the direction represented by next path portion arrow 620a until it reaches its actual ending position (not shown in frame 604a). As may be appreciated with reference to the second frame 604b, the next path portion arrow 620a traces approximately 50% of the path followed by the mouse pointer 610a (as evidenced by the position of the mouse pointer 610b within the second frame 604b). Similarly, in the second frame 604b the previous path portion arrow 640b extends approximately 50% of the distance traversed by the mouse pointer 610b relative to its original position in the first frame 604a, and the next path portion arrow 620b covers approximately 50% of the distance to the position of the mouse pointer within the last frame 604n. Since both the next path portion arrows 620 and previous path portion arrows 640 are curved, the mouse pointer 610 will traverse a generally curved path across the frames 604.

Figure 7:
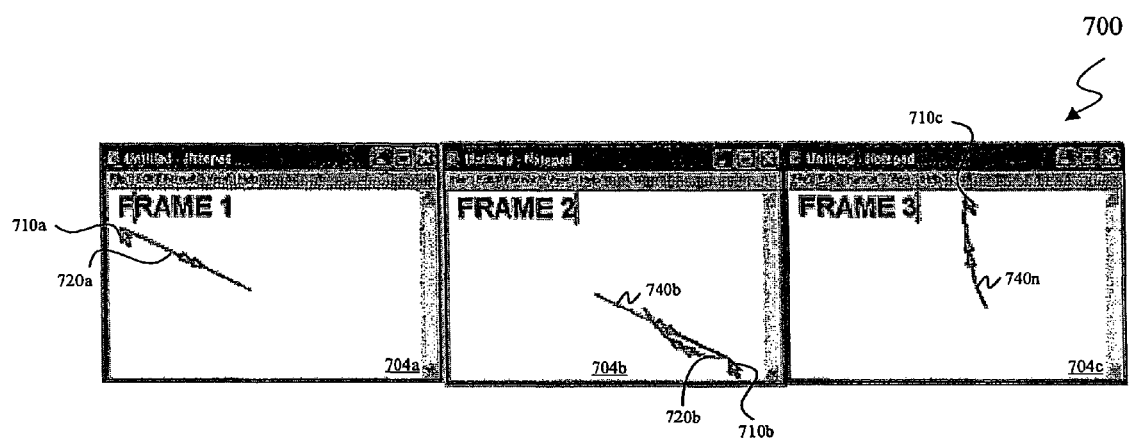
FIG. 7 illustrates a frame sequence similar to that described with reference to FIG. 6, with the exception that a combination of both linear and curved previous/next path portion arrows are utilized.

FIG. 7 illustrates a frame sequence 700 similar to that described with reference to FIG. 6, with the exception that a combination of both curved and linear previous path portion arrows 740 and next path portion arrows 720 are utilized.

Object Translation Between Edit Mode and
Run-Time Mode

In many instances it will be desired to associate various captions or other objects with the mouse pointer appearing in one or more frames of a given movie or other sequenced presentation. However, in cases in which the transition between frames is triggered by a mouse "click" operation, it may be difficult to appropriately position the caption or object relative to the mouse pointer during edit-mode operation, since the caption/object may appear during a different (generally earlier) frame than does the mouse pointer during run-time mode. This could complicate the editing process, as a mouse pointer and its associated caption could inconveniently appear on different frames during edit mode.

In accordance with one aspect of the invention, a translation process occurs during operation in edit and run-time modes which facilitates desired positioning of captions or other objects relative to an associated mouse pointer. Specifically, during edit mode operation a user is permitted to position all captions and other objects within the frame in which the associated mouse pointer will actually appear during run-time mode. Upon completion of edit mode operation, the captions and other objects are translated to the frame in which they will actually appear during run-time mode (typically the frame preceding the frame in which the associated mouse pointer appears). In this way the captions or other objects are caused to appear within the correct frame during run-time mode, but the user is spared the inconvenience of positioning a caption/object on one frame relative to a mouse pointer on another frame during edit mode.

In the discussion which follows, a "caption" comprises a text-based caption or an object linked thereto that is often in some way associated with a mouse pointer. Captions may be displayed during run-time mode either before or after movement or "clicking" of the associated mouse pointer. An "object" may comprise either a caption or another displayed item such as a highlight box or pop-up window. An object is generally displayed after a mouse pointer movement or clicking operation, unless it is associated with a caption that is specified to be displayed prior to mouse movement.

Figure 8:
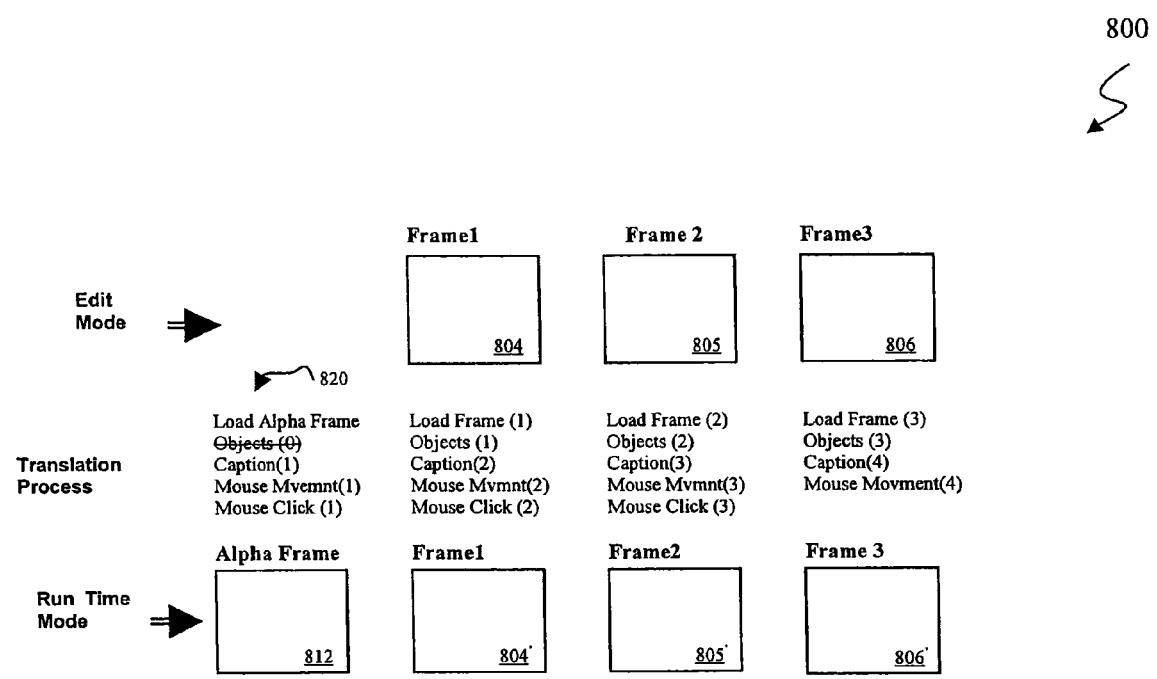
FIG. 8 illustratively represents a translation process occurring between edit mode and run-time mode in accordance with the present invention.

FIG. 8 illustratively represents a translation process 800 occurring between edit mode and run-time mode in accordance with the present invention. In the example of FIG. 8, a user has captured a sequence of first, second and third screen shots 804, 805 and 806 during edit mode for incorporation within a movie or other presentation. During edit mode operation it is also assumed that the user has added various captions and other objects (not shown) to the screen shots 804, 805 and 806. As a consequence, by the completion of edit mode operation the screen shots 804, 805 and 806 have been respectively transformed into "Frame1", "Frame2" and "Frame3". As shown, during run-time operation Frame1, Frame2 and Frame3 are respectively identified by the reference numerals 804', 805' and 806'.

Once edit mode operation has been completed and the user opts to preview or run the movie or other presentation, the inventive translation process occurs. In particular, a copy of Frame1 is made and displayed to the user via monitor 128 as the "Alpha Frame" 812 in FIG. 8. Next, those operations 820 required to be performed prior to the appearance of a mouse pointer within Frame1 804' are performed. As indicated by FIG. 8, the operations 820 include the addition of a Caption (1) and the mouse pointer movement operation denoted as MoveMvmnt(1). Next, the user executes a mouse click operation via mouse 124 (i.e., Mouse Click (1) in FIG. 8) and the video monitor 128 displays Frame1 804'. In this regard any objects associated with Frame1 804' are displayed (i.e., Objects(1) in FIG. 8), and then the addition of captions and mouse pointer operations required to be effected prior to display of Frame2 805' are implemented (i.e., Caption(2), Mouse Mvmnt (2) and Mouse Click(2) in FIG. 8). As is apparent from inspection of FIG. 8, a substantially similar set of operations is carried out in connection with display of Frame3 806'.

Referring now to FIGS. 9-13, the inventive translation process is illustrated by a series of edit-mode screen displays and associated tabular descriptions of the corresponding frames subsequently appearing during run-time mode. Specifically, each of FIGS. 9-13 contains a representation of a particular screen displayed via monitor 128 during edit mode and a tabular description of the manner in which screens will subsequently appear during run time mode. The example of FIGS. 9-13 relates to a movie demonstrating the manner in which two numbers may be added using a conventional "calculator" application program. As is evident upon inspection of FIGS. 9-13, previous/next path portion arrows of the type described above are used to indicate the mouse pointer movement occurring within each frame during subsequent playback of the movie during run-time mode.

Figure 9:
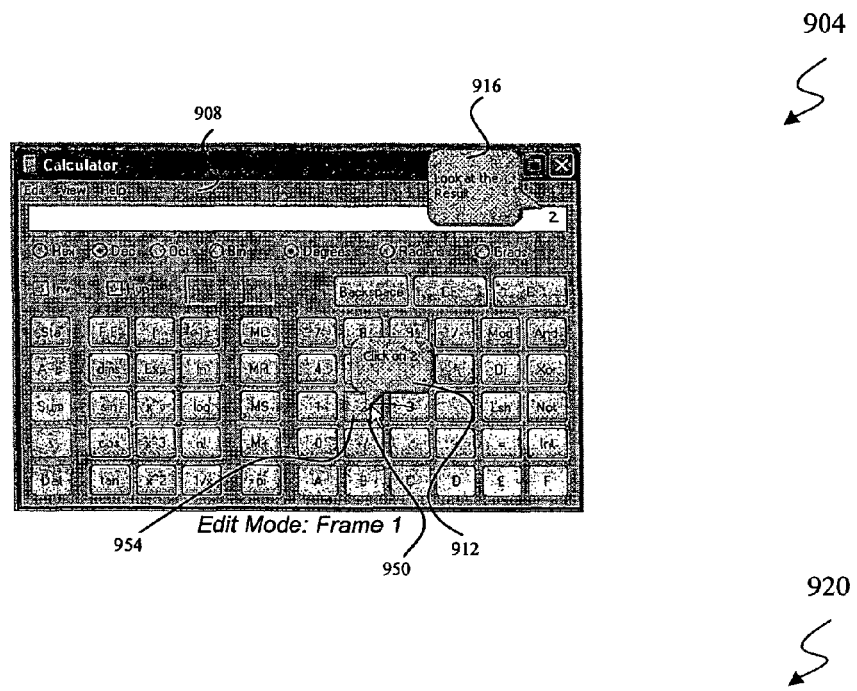
FIG. 9 is a screen display and associated tabular description illustrating an object translation process of the invention.

Turning now to FIG. 9, during edit mode a Frame1 904 comprised of an underlying screen shot 908 is displayed via monitor 128. During the editing process the user adds first and second captions 912 and 916, which are overlaid upon the screen shot 908 and also displayed to the user. As is indicated by table 920, during run-time mode an alpha frame corresponding to underlying screen shot 908 is initially loaded and displayed via monitor 128 absent the overlying first and second captions 912 and 916. Next, a first mouse pointer event is executed (i.e., Display Caption (1) in table 920) and the first caption 912 is displayed over screen shot 908. Finally, another mouser pointer event (i.e., Mouse Click (1) in table 920) is executed and the mouse pointer 950 is depicted as "clicking" a button 954 corresponding to the numeral "2".

Figure 10:
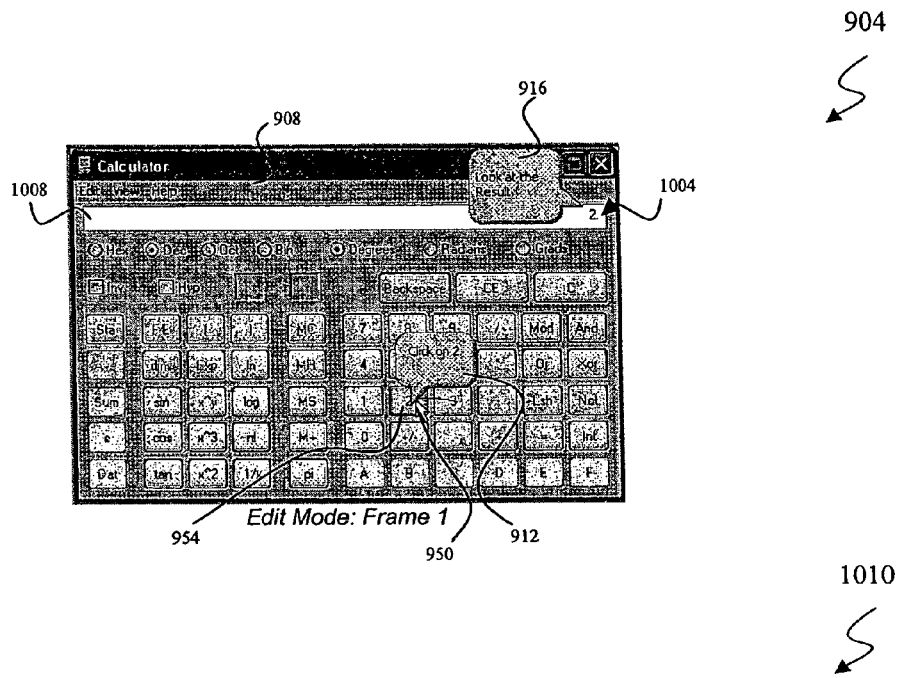
FIG. 10 is a next screen display and associated tabular description illustrating an object translation process of the invention.

Referring to the screen display of FIG. 10, following the clicking of button 954 a representation 1004 of the numeral 2 appears in display area 1008 of the underlying screen shot 908 during run-time mode. As is indicated by table 1010, the translation process also executes a mouse pointer event (i.e., Objects Frame (1) in table 1010) and the second caption 916 appears. Table 1010 also specifies various other mouse pointer events (e.g., Mouse Movement (2)) executed during the translation process and the resultant animation or objects displayed to the user (e.g., "Mouse moves towards the +") during presentation of the next frame in run-time mode.

Figure 11:
FIG. 11 is a next screen display and associated tabular description illustrating an object translation process of the invention.
Figure 11:
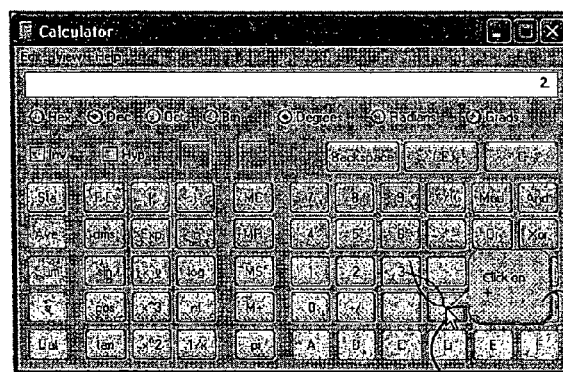
Figure 11:
Figure 12:
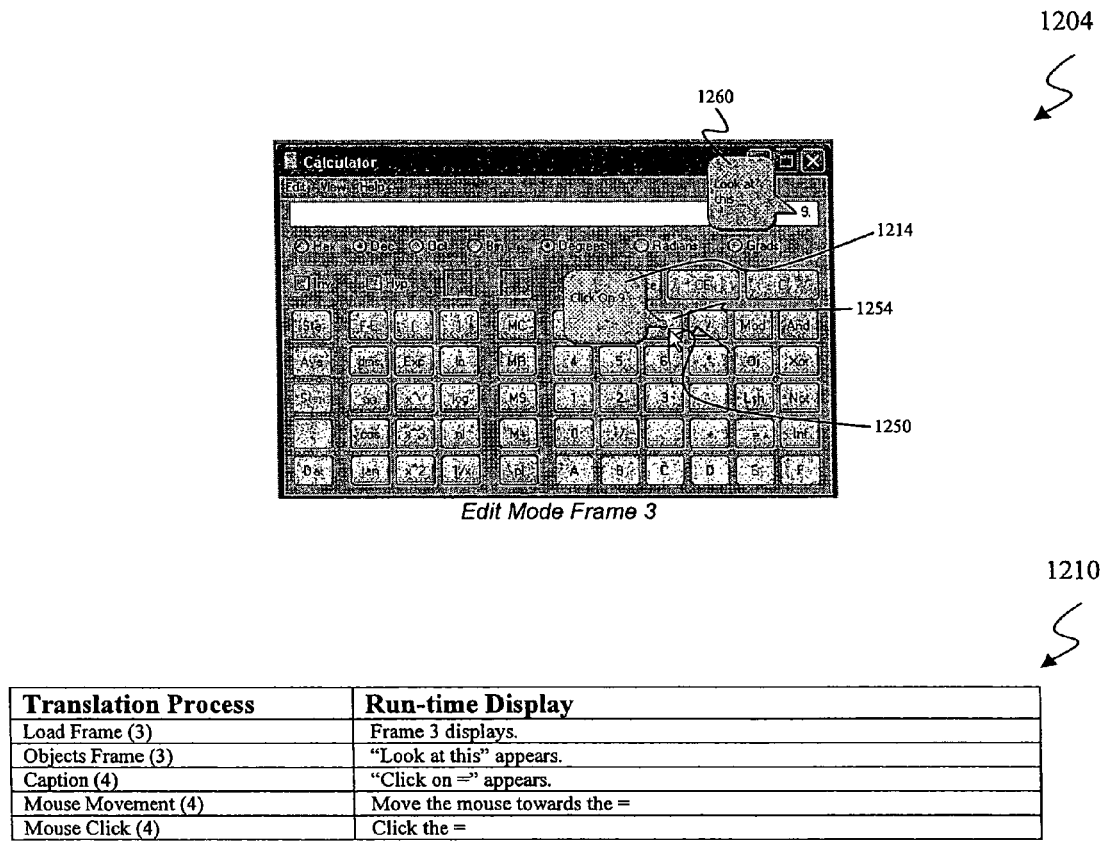
FIG. 12 is a next screen display and associated tabular description illustrating an object translation process of the invention.

FIG. 11 illustratively represents a Frame2 1104 screen display appearing during edit mode, as well as a table 1110 describing various objects and animation subsequently displayed to a user during run-time mode. Similarly, FIG. 12 illustratively represents a Frame3 1204 screen display appearing during edit mode as well a table 1210 describing various objects and animation subsequently displayed to a user during run-time mode. As is indicated by table 1110, display of Frame2 1104 during run-time mode is initiated via execution during the translation process of a "Load Frame (2)" event. The display process is continued through the subsequent appearance of a caption 1214 (FIG. 12) during run-time mode as a consequence of execution of a Caption (3) event. The mouse pointer 1250 (FIG. 12) then moves toward a button 1254 representative of the numeral "9". A frame transition operation is then initiated upon execution of a click operation (i.e., Mouse Click (3) in table 1110) relative to the button 1254. As is indicated by table 1210, a frame transition occurs at this point during run-time mode (i.e., "Load Frame (3) is executed), which causes the Frame3 1204 to be displayed. Next, a caption 1260 appears upon execution during the translation process of a "Load Frame (3)" operation.

Figure 13:
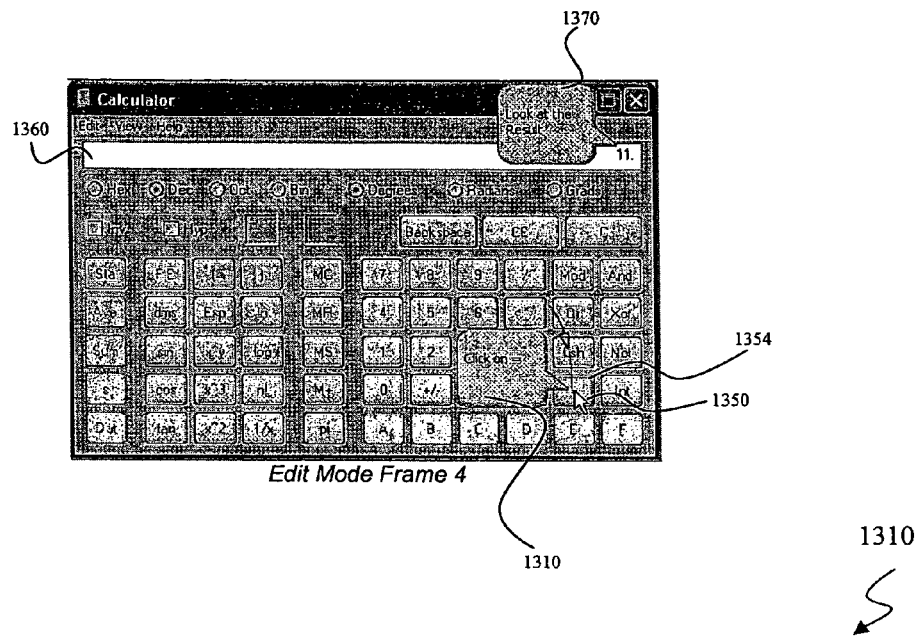
FIG. 13 is a next screen display and associated tabular description illustrating an object translation process of the invention.

Again referring to table 1210, a caption 1310 created during edit mode with reference to a Frame4 1304 screen display (FIG. 13) is displayed during run-time mode following the appearance of caption 1260. Next, mouse pointer 1350 is moved toward a button 1354 representative of the "=" sign. The user then witnesses clicking of the button 1354 as a consequence of execution of "Mouse Click (4)" operation (see table 1210). As a result of this operation a frame transition is initiated (i.e., Load Frame (4) operation of table 1310), and the numeral "11" is made to appear within the calculator display area 1360 (FIG. 13). Finally, the caption object 1370 is displayed upon execution during the translation process of an Objects Frame (4) operation (table 1310).

Figure 14:
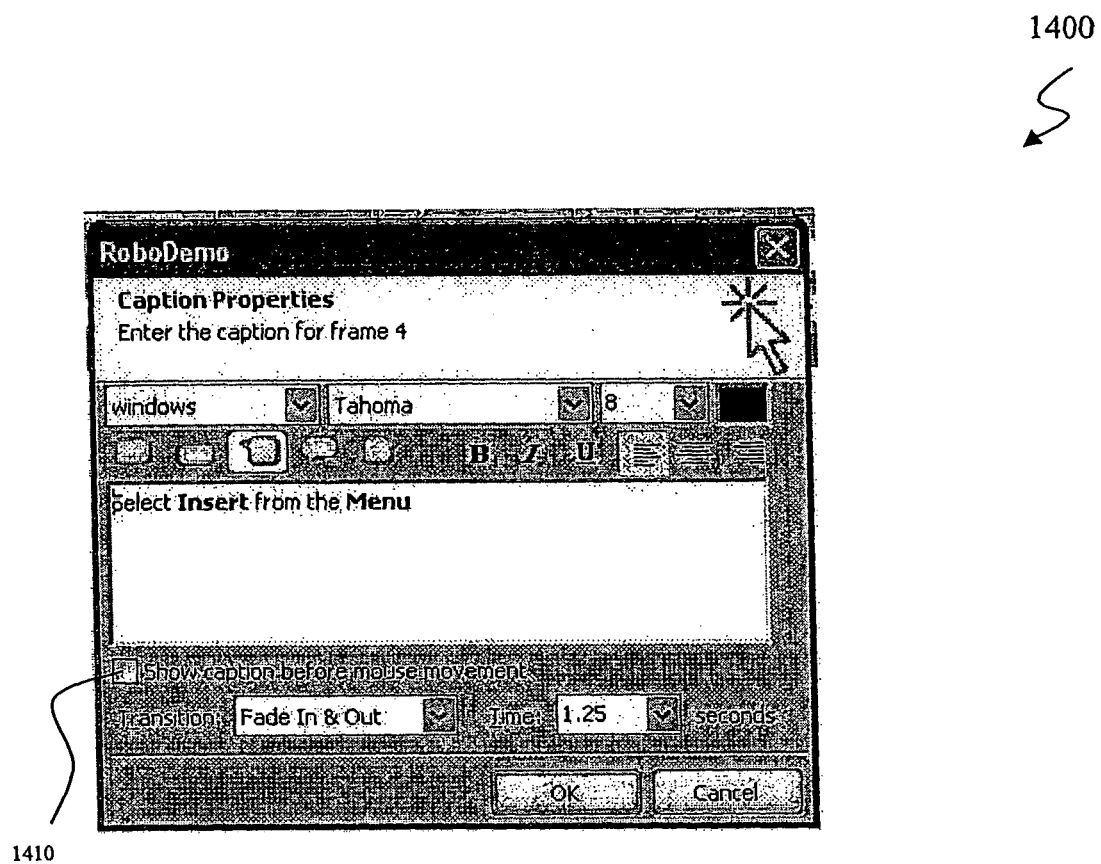
FIG. 14 is an edit-mode screen display of a Caption Properties dialog box through which a user may specify the sequence of the appearance of captions or other objects relative to the occurrence of mouse pointer animation.

FIG. 14 is an edit-mode screen display of a Caption Properties dialog 1400 through which a user may specify the sequence of the appearance of captions or other objects relative to the occurrence of mouse pointer animation. That is, the user may specify whether a given caption will appear either before or after movement of the associated mouse pointer, as well as the order of such appearance relative to the mouse pointer movement. In the exemplary embodiment captions appear by default subsequent to movement of the associated mouse pointer. However, as indicated by FIG. 14, a user may instead specify that such captions appear prior to such movement by checking the appropriate box 1410. Upon adding a caption to a screen shot, the dialog box 1400 may be caused to appear by right-clicking on the caption and choosing "Properties". A user may then specify the order and timing of appearance of the applicable caption via the dialog box 1400 as discussed above.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A non-transitory computer-readable storage device containing instructions which, when executed by a computer system, create a presentation based on displayed information, the instructions comprising:
    instructions for capturing a first screen shot containing a first portion of the displayed information;
    instructions for capturing a second screen shot containing a second portion of the displayed information;
    instructions for storing a first cursor pointer position associated with the first screen shot;
    instructions for storing a second cursor pointer position associated with the second screen shot; and
    instructions for displaying, superimposed on the first screen shot, a first previous path portion to a first displayed cursor pointer position and a first next path portion from the first displayed cursor pointer position in a direction towards the second cursor position, the first previous path portion and the first next path portion being representative of a first cursor path to be traversed by a cursor pointer during playback of the presentation.

2. The non-transitory computer-readable storage device of claim 1 further comprising:
    instructions for creating and displaying the presentation as an animated presentation that transitions from a view based on said first screen shot to a view based on said second screen shot and said pointer transitioning from said first cursor pointer position to said second cursor pointer position.

3. The non-transitory computer-readable storage device of claim 1, wherein the instructions for displaying comprise instructions for displaying the first previous path portion and the first next path portion simultaneously with the first screen shot.

4. The non-transitory computer-readable storage device of claim 1, further comprising instructions for displaying a cursor pointer at the first cursor pointer position superimposed on the first screen shot.

5. A method for representing animation of a cursor object during creation of a presentation, the method comprising:
    capturing a first screen shot from a computer display;
    storing a first cursor pointer position associated with said first screen shot;
    capturing a second screen shot from said computer display;
    storing a second cursor pointer position associated with said second screen shot, wherein said first and second cursor pointer positions are stored separately from said first and second screen shots;
    determining a cursor pointer path from said first cursor pointer position to said second cursor pointer position; and
    displaying a representation of said cursor pointer path simultaneously with said first screen shot,
    wherein said representation of said cursor pointer path includes:
        a portion showing a previous section of said path leading to the first cursor pointer position, and
        a portion showing a next section of said path leading to the second cursor pointer position, said path sections joined by a representation of said cursor pointer object.

6. The method of claim 5 further comprising:
    during run time of said presentation, displaying an animated transition from a first view based upon said first screen shot to a second view based on said second screen shot wherein said cursor pointer object traverses said path.

7. The method of claim 5 further comprising:
    receiving input specifying a position of a first display item relative to the first screen shot and a sequence of display of the first display item relative to cursor pointer animation to occur during presentation run time; and
    displaying the first display item with reference to the second screen shot in the desired sequence during the presentation run time.

8. The method of claim 5 wherein said representation of said cursor pointer path includes a curved line.

9. The method of claim 5, wherein the representation of the cursor pointer path comprises one or more lines or curves along the cursor pointer path, the one or more lines or curves displayed simultaneously with the first screen shot.

10. A non-transitory computer-readable storage device containing instructions executable by a computer system, the instructions comprising:
    instructions for capturing a first screen shot;
    instructions for capturing a second screen shot;
    instructions for storing a first cursor pointer position associated with the first screen shot and instructions for storing a second cursor pointer position associated with the second screen shot, the first and second cursor pointer positions stored separately from said first and second screen shots;
    instructions for determining a path between the first cursor pointer position and second cursor pointer positions;
    instructions for generating a graphical element representing at least a portion of the path, the graphical element comprising one or more lines or curves based on the determined path, wherein the graphical element is a separate element from the first screen shot and the second screen shot; and
    instructions for displaying, simultaneously with the first screen shot, the graphical element along the at least one portion of the path.

11. The non-transitory computer-readable storage device of claim 10, further comprising instructions for displaying a cursor pointer at the first cursor pointer position superimposed on the first screen shot.

12. A non-transitory computer-readable storage device containing instructions executable by a computer system, the instructions comprising:
    instructions for capturing and storing a first screen shot;
    instructions for capturing and storing a second screen shot;
    instructions for receiving a selection of a first location within the first screen shot;
    instructions for receiving a selection of a second location within the second screen shot;
    instructions for automatically determining a path from the first location to the second location;
    instructions for displaying the first screen shot and a first line segment superimposed on the first screenshot, the first line segment indicating a first portion of the path beginning at the first location; and instructions for displaying the second screen shot and a second line segment superimposed on the second screenshot, the second line segment indicating second portion of the path ending at the second location.

13. The non-transitory computer-readable storage device of claim 12, further comprising:
instructions for generating and displaying an animation based on the first screen shot, the second screen shot, the first location, the second location, and the path,
the animation showing a representation of a cursor pointer moving from the first location on the first screen shot to the second location on the second screen shot along the path, and
the animation showing the representation of the cursor pointer in at least one location along the path between the first location and the second location.

\* \* \* \* \*